(12) United States Patent
Yim et al.

(10) Patent No.: US 11,403,582 B2
(45) Date of Patent: Aug. 2, 2022

(54) LOGISTICS MANAGING METHOD AND ELECTRONIC DEVICE PERFORMING THE SAME

(71) Applicant: Coupang Corp., Seoul (KR)

(72) Inventors: Sang Ho Yim, Seoul (KR); Kyung Jae Lee, Seoul (KR); Sang Hee Ahn, Seoul (KR); Sang Ho Lee, Seoul (KR); Woong Kim, Seoul (KR); Chang Geun Jin, Seoul (KR); Lianxi Bai, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/081,891

(22) Filed: Oct. 27, 2020

(65) Prior Publication Data
US 2022/0067633 A1    Mar. 3, 2022

(30) Foreign Application Priority Data
Sep. 1, 2020    (KR) .......................... 10-2020-0111347

(51) Int. Cl.
*G06Q 10/08* (2012.01)
*G06Q 10/06* (2012.01)

(52) U.S. Cl.
CPC ......... *G06Q 10/08* (2013.01); *G06Q 10/0631* (2013.01)

(58) Field of Classification Search
CPC ..... G06Q 10/083; G06Q 10/087; G06Q 10/06
USPC ................................. 705/7.11, 330, 331, 332
See application file for complete search history.

(56) References Cited

U.S. PATENT DOCUMENTS

| | | | |
|---|---|---|---|
| 6,208,908 B1 | 3/2001 | Boyd et al. | |
| 9,751,693 B1* | 9/2017 | Battles | B25J 9/0093 |
| 2014/0291112 A1* | 10/2014 | Lyon | B65G 1/1378 |
| | | | 198/341.01 |
| 2016/0009493 A1 | 1/2016 | Stevens et al. | |
| 2016/0185528 A1 | 6/2016 | Hara et al. | |
| 2017/0213183 A1 | 7/2017 | Hu | |
| 2018/0065156 A1* | 3/2018 | Winkle | B07C 5/342 |
| 2019/0016533 A1* | 1/2019 | Post | B65G 1/1376 |
| 2020/0202290 A1 | 6/2020 | Lo et al. | |

(Continued)

FOREIGN PATENT DOCUMENTS

| | | |
|---|---|---|
| CN | 106997517 A | 8/2017 |
| CN | 107274125 A | 10/2017 |

(Continued)

OTHER PUBLICATIONS

Ulin, Sheryl S, and W Monroe Keyserling. "Case Studies of Ergonomic Interventions in Automotive Parts Distribution Operations." Journal of occupational rehabilitation 14.4 (2004): 307-326. Web. (Year: 2004).*

(Continued)

*Primary Examiner* — Akiba K Robinson
(74) *Attorney, Agent, or Firm* — Banner & Witcoff, Ltd.

(57) ABSTRACT

A logistics managing method according to example embodiments may include identifying at least one tote included in a tote set, identifying a station set corresponding to the tote set among at least one station set based on an attribute of an item included in the at least one tote, and determining one of the at least one station included in the station set to be a destination of the at least one tote. Other various embodiments are also possible.

20 Claims, 8 Drawing Sheets

(56) References Cited

U.S. PATENT DOCUMENTS

2020/0283229 A1* 9/2020 Edwards ................ B25J 11/008
2020/0302391 A1 9/2020 Li et al.
2020/0376668 A1* 12/2020 Russell ................. B25J 9/1697

FOREIGN PATENT DOCUMENTS

| | | |
|---|---|---|
| CN | 110422526 A | 11/2019 |
| JP | H 10-097657 A | 4/1998 |
| JP | 2000-296903 A | 10/2000 |
| JP | 2002-284314 A | 10/2002 |
| JP | 2008-265894 A | 11/2008 |
| JP | 2017-522247 A | 8/2017 |
| KR | 10-1391998 | 5/2014 |
| KR | 10-2015-0053443 A | 5/2015 |
| KR | 10-1523533 | 5/2015 |
| KR | 101827482 B1 | 2/2018 |
| KR | 10-1947736 | 2/2019 |
| KR | 10-2019-0059836 A | 5/2019 |
| KR | 10-2046948 | 11/2019 |
| WO | 2019223703 A1 | 11/2019 |

OTHER PUBLICATIONS

"Sorting/shipping Conveyor System Improves Both Customer Service and Ergonomics." Modern materials handling 51.14 (1996): 25-. Print. (Year: 1996).*
International Search Report issued in PCT/KR2020/012059 dated May 27, 2021.
Dec. 16, 2021—(HK) Office Action Appl. No. 22020021467.8.

* cited by examiner

FIG. 4

▨ : Tote being moved    ▨ : Arrived tote

Station set: All

| | 401 | 402 | 403 | 404 | 405 | | | 406 |
|---|---|---|---|---|---|---|---|---|
| | Tote set | Task status | Shipping request time | Station set | Tote information | | | Search |
| | 453 | Picked up | 2020-03-24 19:30:00.0 | Y Line | 453213 | | | |
| | 477 | Picked up | 2020-03-24 19:30:00.0 | Z Line | 477353 | 477245 | | |
| | 452 | Picked up | 2020-03-24 19:30:00.0 | X Line | 452101 452862 | 452614 | 452903 452245 | 452288 |
| | 461 | Picked up | 2020-03-24 19:30:00.0 | Z Line | 461452 461213 | 461653 | 461903 463344 | 461115 |
| | 471 | Picked up | 2020-03-24 19:30:00.0 | Z Line | 471366 | 471801 | 471884 471274 | 471238 |
| | 456 | Picked up | 2020-03-24 19:30:00.0 | Z Line | 456861 | | | |

FIG. 5

| Station set | Station | Station set setting change |
|---|---|---|
| X Line | X1<br>X2<br>X3<br>X4<br>X5<br>X6<br>X7 | |
| Y Line | Y1 | |
| Z Line | Z1 | |

FIG. 6

601 — Tote set ID — 453
602 — Task status — Picked up
603 — Manager information — 2020-07-31 14:36:15 By John
604 — Shipping request time — 2020-07-31 17:45:00
605 — Pickup completion time — 2020-07-31 14:39:39
606 — Destination — Packing - Z Line - Z1
607 — Cart (tote) — 453213

Search

| Batch job | Manager ID |
|---|---|
| 1277769888 Picked up | John Log in |

608  609

| Shipping number | Order number | Cart (tote) |
|---|---|---|
| Select shipping number | Select order number | |
| 10258  24075  84243  30174  88297  14528 | 70925  82344  31448  19544  16850  69203 | 453213 |

| 701 | 702 | | 703 | 704 | 705 | 706 |
|---|---|---|---|---|---|---|
| Tote | Tote use | | Destination | | | Request |
| 456861 | Packing | | Z1 | | | Stock clearance |
| | | | Status | Request date | | |
| | | | Tote transfer completed [2020-07-31 14:25:19] | 2020-07-31 14:20:25 | | |

| 707 | 708 | 709 |
|---|---|---|
| Tote set | Batch Job ID | Shipping request time |
| 456 | 127767049 [Picked up] | 2020-07-31 17:45:00 |

| 710 | 711 | 712 |
|---|---|---|
| Rebatch location | Rebin location | Packing location |
| - | - | Z Line – Z1 |

| Pickup information (requested/ongoing/finished) | SKU | | Shipping number | | | | Tote | Pickup completion time |
|---|---|---|---|---|---|---|---|---|
| FINISHED 2/0/2 | 1347601 White clay foam 150G*2 | | 69404 | 70731 | | | 456861 | 2020-07-31 14:17:37 |
| FINISHED 1/0/1 | 9080173 Disposable scrubber, 60 sheets, 2 packs | | | | 64242 | | 456861 | 2020-07-31 14:17:57 |
| FINISHED 1/0/1 | 101631889 Disposable mask, 50 pcs, 1 pack | | | | | 23094 | 456861 | 2020-07-31 14:18:17 |
| FINISHED 1/0/1 | 1312757 Shampoo 680ML × 3 | | | | | 35639 | 456861 | 2020-07-31 14:19:43 |
| FINISHED 1/1/0 | 100029704 Hairdryer 2200W | | | | | 73172 | 456861 | 2020-07-31 14:20:23 |
| 713 | 714 | | 715 | | | | 716 | 717 |

LOGISTICS MANAGING METHOD AND ELECTRONIC DEVICE PERFORMING THE SAME

BACKGROUND

Technical Field

Example embodiments of the present disclosure relate to a logistics managing method and an electronic apparatus performing the same.

Description of the Related Art

As the use of the Internet becomes familiar, the e-commerce market is expanding. Transactions in the e-commerce market take place online through a network, and products that have been traded in e-commerce may be delivered to a destination set by a customer through a delivery service. As the e-commerce is expanding, a trading brokerage service that mediates a sale between a seller and a buyer and provides the delivery service is also being activated.

For example, a logistics management system for providing the trading brokerage service may store products received from a producer in a warehouse of a specific fulfillment center. When a request (e.g., order) for delivery of the products is made by a purchaser or customer, the system may pick the corresponding product from the warehouse and deliver the product to the purchaser through a courier.

If a delivery volume increases in such an environment, an action for handling the increased delivery volume in the fulfillment center may be required. More specifically, there is a desire for a method to provide an efficient process of picking an item to be delivered in the fulfillment center and packing the item, and a system using the method.

SUMMARY

Technical Goals

Since vast quantities of items are stored and managed in a fulfillment center, a logistics management service needs to prepare a method for more efficiently and systematically storing, moving, sorting, and packing items in a process of processing the items received in the fulfillment center until the items are shipped.

To solve the above issues, the present disclosure is to provide a method of instructing an item transfer in a fulfillment center such that an item picked in response to a customer's order is efficiently packed and a management system therefor.

Example embodiments of the present disclosure propose a method and apparatus for efficiently managing and processing items received in a fulfillment center.

Technical Solutions

According to an aspect, there is provided a logistics managing method including identifying at least one tote included in a tote set, identifying a station set corresponding to the tote set among at least one station set based on an attribute of an item included in the at least one tote, and determining one of the at least one station included in the station set to be a destination of the at least one tote.

According to another aspect, there is also provided an electronic apparatus including a communication module, a display, and a processor. The processor is set to identify at least one tote included in a tote set, identify a station set corresponding to the at least one tote among at least one station set based on an attribute of an item included in the at least one tote, and determine one of the at least one station included in the station set to be a destination of the at least one tote.

Effects

A logistics managing method according to example embodiments may simplify a shipping process by handling picked items of at least some tote sets to be immediately shipped through a packing task without performing a separate sorting task and may reduce logistics managing costs by reducing a lead time in a fulfillment center.

A logistics managing method according to example embodiments may provide a user interface for identifying a tote processing status to ensure more systematic logistics management.

When a plurality of stations are provided for a predetermined task (e.g., packing) in a fulfillment center, a logistics managing method according to example embodiments may efficiently distribute totes to each of the stations, thereby preventing work overload of a specific station.

BRIEF DESCRIPTION OF THE DRAWINGS

FIG. 4 is a diagram illustrating display screen information of an electronic apparatus according to an example embodiment of the present disclosure.

FIG. 5 is a diagram illustrating a display information screen of an electronic apparatus according to an example embodiment of the present disclosure.

FIG. 6 is a diagram illustrating a display information screen of an electronic apparatus according to an example embodiment of the present disclosure.

FIG. 7 is a diagram illustrating a display information screen of an electronic apparatus according to an example embodiment of the present disclosure.

DETAILED DESCRIPTION

Figure 1:
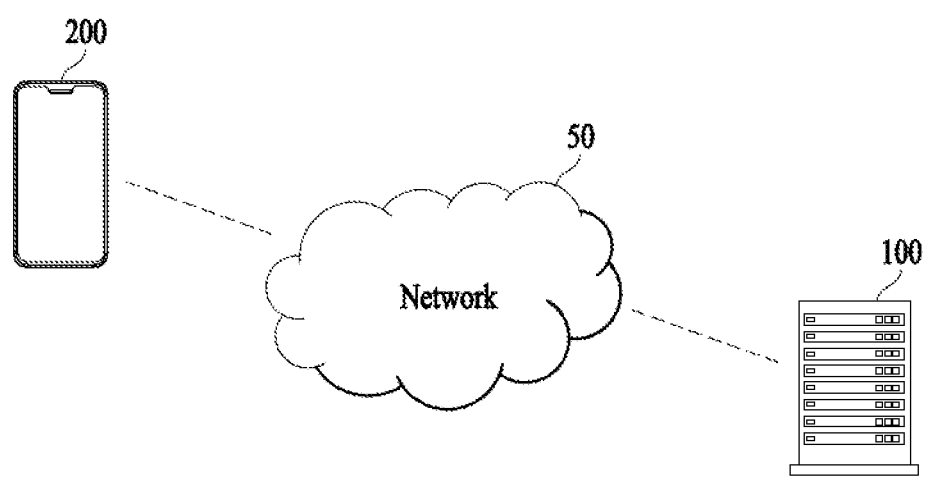
FIG. 1 is a block diagram illustrating a logistics management system according to example embodiments of the present disclosure.

Hereinafter, example embodiments of the present disclosure will be described in detail with reference to the accompanying drawings.

In describing the embodiments, descriptions of technical contents that are well known in the art to which the present disclosure belongs and are not directly related to the present specification will be omitted. This is to more clearly communicate without obscure the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following exemplary embodiments that will be described in more detail with reference to the accompanying drawings. It should be noted, however, that the present disclosure is not limited to the following exemplary embodiments, and may be implemented in various forms. Accordingly, the exemplary embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

A term "part" used herein refers to software or a hardware component such as an FPGA or an ASIC, and the "part" performs certain roles. However, the "part" is not meant to be limited to software or hardware. The "part" may be configured to be in an addressable storage medium or may be configured to play one or more processors. Thus, as an example, the "part" may include components such as software components, object-oriented software components, class components, and task components, and processes, functions, properties, procedures, subroutines, segments of program code, drivers, firmware, microcode, circuits, data, databases, data structures, tables, arrays, and variables. The functionality provided within the components and the "parts" may be combined into a smaller number of components and the 'parts' or further separated into additional components and the "parts". In addition, the components and the "parts" may be implemented to play one or more CPUs in the device or secure multimedia card.

FIG. 1 is a block diagram illustrating a logistics management system according to example embodiments of the present disclosure.

According to example embodiments, a logistics management system may include an electronic apparatus 100 (e.g., server), a user terminal 200, and a network 50.

The electronic apparatus 100 (e.g., server) may be a device for handling various processes for logistics management and may perform, for example, stock management of items received in a fulfillment center, transfer management of items in the fulfillment center, or task processing management for at least one of a picking task, a sorting task, and/or a packing task of items. In an example embodiment, item picking may be a procedure of collecting items received in the fulfillment center and picking the items for further processing, sorting may be a procedure of sorting the picked items based on predetermined order information, and packing may be a procedure of wrapping the picked or sorted items in a box or plastic for delivery.

The electronic apparatus 100 may include a plurality of computer system implemented as a network server or computer software and may provide various information by configuring the information into a web page. For example, the electronic apparatus 100 may refer to computer software and a computer system connected to a sub-device that communicates with another network server through a computer network such as an intranet or the Internet to receive a request to perform a task, perform the task, and provide a result of the task. In addition, the electronic apparatus 100 may be understood as a broad concept including a series of application programs that operate on a network server and various databases built therein. For example, the electronic apparatus 100 may be implemented using a network server program that is provided in various ways based on an operating system such as DOS, Windows, Linux, UNIX, MacOS, or the like.

The network 50 may serve to connect the electronic apparatus 100 and the user terminal 200 or connect the electronic apparatus 100 and an external device (not shown). For example, the network 50 may provide an access path so that the user terminal 200 is connected to the electronic apparatus 100 to transmit and receive packet data.

According to an example embodiment of the present disclosure, operations of the logistics management system may be implemented through the electronic apparatus 100. Also, the user terminal 200 may be connected to the logistics management system through the network 50. The electronic apparatus 100 may store information received from the user terminal 200 in a database or provide information stored in the database to the user terminal 200.

According to another example embodiment, the logistics management system may be implemented in the user terminal 200. For example, a user may install and use the logistics management system in a form of an application on the user terminal 200 through the network 50.

The logistics management system according to example embodiments may be implemented as a single physical device or may be implemented as a plurality of physical devices combined organically. For example, some of the components included in the logistics management system may be implemented as one physical device, and some of the components included in the logistics management system may be implemented as another physical device. For example, one physical device may be implemented as a part of the electronic apparatus 100, and another physical device may be implemented as a part of the user terminal 200 or a part of an external device (not shown). In some cases, components included in the logistics management system may be distributed and arranged in different physical devices. The distributed components may be organically combined to perform functions and operations of the logistics management system.

Figure 2:
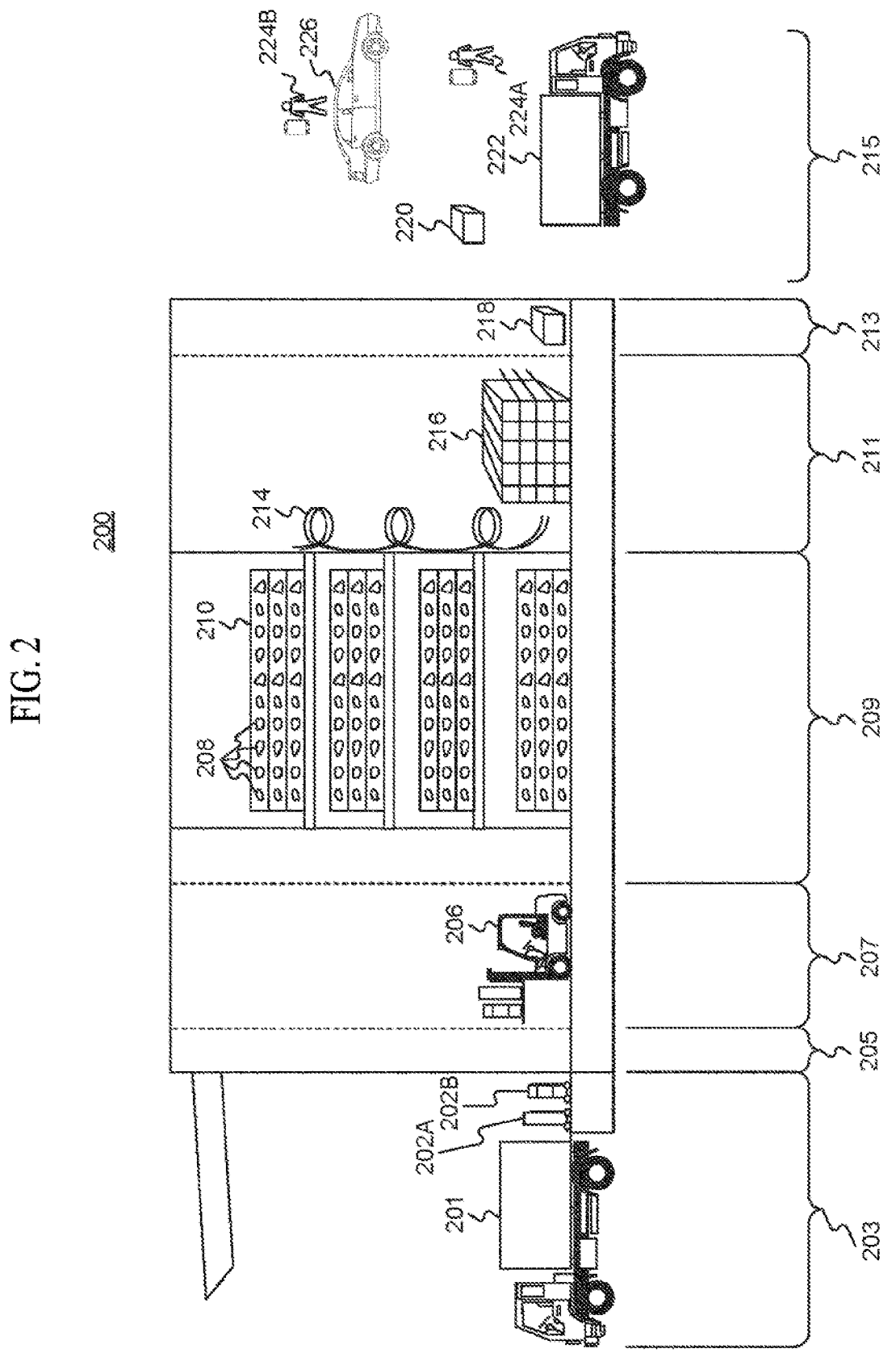
FIG. 2 is a diagram illustrating a logistics processing process in a logistics management system according to an example embodiment of the present disclosure.

FIG. 2 is a diagram illustrating a logistics processing process in a logistics management system according to an example embodiment of the present disclosure.

A fulfillment center (FC) 200 may correspond to a warehouse area in which items to be delivered to purchasers are stored and managed. For example, as illustrated in FIG. 2, the FC 200 may be divided into a plurality of zones 203, 205, 207, 209, 211, 213, and 215. The zones may be virtual separated spaces for explaining a series of handling processes for receiving, storing, relocating, retrieving, sorting, shipping, and delivering items. As would be apparent to those skilled in the art, at least some of the above-described plurality of zones may be omitted, further divided, or changed within the scope of various embodiments of the present disclosure.

A schematic flow of a logistics processing process according to example embodiments will be described with reference to FIG. 2. Items provided from sellers may be received at a first zone 203 (e.g., inbound zone) of the FC 200. The received items may be transferred through a second zone 205 (e.g., buffer zone) and a third zone 207 (e.g., drop zone) to a fourth zone 209 (e.g., picking zone) so as to be stored. In response to an order for a specific item being received from a purchaser, items picked from the fourth zone 209 may be accommodated in a tote (or tote box) and transmitted to a fifth zone 211 (e.g., packing zone) through a predetermined carrier 214 for packaging. The items packed in the fifth zone 211 may be stored in a sixth zone 213 (e.g., hub zone) to be shipped (outbound) by a courier. The items may be delivered from a seventh zone 215 (e.g., camp zone) to respective destinations. In the example embodiment, the tote may be used in an item picking process. Thereafter, the tote may be moved to a station in which an item sorting or packing process is performed such that items in the tote are sorted or packed. Each tote may include identification information. The logistics management system may identify a current status of the tote based on the identification information of the tote. Specifically, an operator who picks, sorts, and packs the item may transmit the identification information of the tote to the system along with task status information based on a task status, so that the system identifies a current task processing status of the items included in the tote based on information received from each operator.

Specifically, in the first zone 203, items 202A and 202B received from a seller may be received in the FC 200. The seller may transmit the items 202A and 202B to the FC 200 using transportation, for example, a truck 201. In the first zone 203, the operator may identify a type of the received item, a quantity of the received item, whether the item is damaged, and the like and provide related information to the user terminal 200 (or the electronic apparatus 100). For example, the operator may transmit only an item satisfying a predetermined condition to the second zone 205.

The second zone 205 may correspond to a space that serves as a preliminary storage for the fourth zone 209 (e.g., picking zone). For example, when an item of a quantity greater than or equal to an expected quantity to be ordered is stored in the fourth zone 209, and when an item of the same type is received, the corresponding items may be temporarily stored in the second zone 205. When an additional storage of the item is requested in the fourth zone 209, the operator may move the items stored in the second zone 205 to the third zone 207, and then move the items moved to the third zone 207 to the fourth zone 209 again. The relocating task may be performed using, for example, a forklift 206.

The third zone 207 may correspond to a place in which the items are stored until the items are placed in the fourth zone 209. In the third zone 207, the operator may identify (e.g., scan) identification information (e.g., barcode) of the items using the user terminal 200 and transfer the items to the fourth zone 209. The items moved to the fourth zone 209 may be placed in predetermined storage areas (e.g., shelves, boxes, totes, refrigerators, freezers, etc.) of the fourth zone 209.

For example, the fourth zone 209 may include a plurality of floors, each having a storage area 210. In the fourth zone 209, the operator may receive task instruction information indicating that items 208 are to be placed in a predetermined location of the storage area 210 through the user terminal 200 and place the items 208 in the predetermined location of the storage area 210 based on the task instruction information. For example, the operator may identify identification information (e.g., barcode) of the items 208 to be placed using the user terminal 200 and identify identification information (e.g., barcode) corresponding to the predetermined location of the storage area 210 in which the items 208 are to be placed. As such, the operator may provide information associated with a location in which the items 208 are to be placed in the fourth zone 209 to the user terminal 200 (or the electronic apparatus 100).

Meanwhile, at least some of the items placed in the fourth zone 209 may be picked based on picking task instruction information generated in response to an order request from a purchaser and accommodated in at least one tote (or tote box). For example, in the fourth zone 209, the operator may receive task instruction information indicating to retrieve and pick a portion of the items placed in the storage area 210 through the user terminal 200 and perform a picking task based on the task instruction information.

The tote including the picked item may be moved to a destination where a subsequent task is to be performed. The tote may be moved to, for example, a station in which a packing task is to be performed or a station in which a sorting task is to be performed. The electronic apparatus 100 may determine a destination (station) to which the tote is to be moved based on an attribute of the item included in the tote and provide related information to the operator.

For example, the operator may deliver the tote to a predetermined destination of the fifth zone 211 using the predetermined carrier 214 (e.g., conveyor belt, elevator, cart, hand truck, dolly, etc.).

The fifth zone 211 may include a stage area in which a packing task is performed using boxes, bags, or plastic to deliver the item received from the fourth zone 209 to the purchaser. Also, the fifth zone 211 may further include a stage area in which a sorting task of the item is performed before the packing task is performed.

According to an example embodiment, the electronic apparatus 100 may allocate one or more orders received from a purchaser based on a designated condition in units of a batch. For example, the electronic apparatus 100 may allocate predetermined orders (or items) in units of the batch based on attributes of the orders or attributes of the ordered items.

As an example, the electronic apparatus 100 may provide picking task instruction information to one operator such that the operator collectively picks items included in a predetermined batch in the fourth zone 209. In this case, the operator may perform the picking task until all items in the batch are picked up. The items included in the batch may be stored in a single tote (or tote set) without being mixed with items included in another batch. For example, items (item 1, item 2, and item 3) included in a batch A may be stored in a first tote. The first tote may be moved to a specific stage area related to the packing task. At least some items included in the batch A may be packed in a single box or bag for delivery.

As another example, to more quickly and efficiently process the picking task, the electronic apparatus 100 may provide picking task instruction information to a plurality of operators such that the picking task is performed on items close to a position of the corresponding operator in the fourth zone 209 irrespective of an allocated batch. In this case, items included in one batch may be allocated to different operators. Also, the items included in the batch may be picked by operators and stored in different totes. For example, items (item 1, item 2, and item 3) included in the batch A may be stored in the first tote, a second tote, and a third tote. The items of the batch stored in the different totes may be moved to a stage area related to a task of sorting items included in a tote, and the sorting task may be performed such that items corresponding to each batch are stored in the same tote (or, tote set). For example, the first tote including the item 1, the second tote including the item 2, and the third tote including the item 3 may be moved to respective stage areas related to the sorting task and stored in a fourth tote collectively. As such, the tote on which the sorting task is performed in units of the batch may be transferred to a stage area in which the packing task is to be performed in the fifth zone 211.

As still another example, as a method for omitting the above-described sorting task, the electronic apparatus 100 may process each item to be packaged using a single plastic for delivery based on an attribute of the item included in the order. In this case, since items included in a specific batch do not need to be accommodated in the same tote (or tote set) for packaging, the corresponding totes may be transferred directly to the stage area related to the packing task not through a stage area related to a separate sorting task. Through this, the electronic apparatus 100 may simplify a task processing process of a predetermined item and reduce logistics management costs.

The electronic apparatus 100 may determine whether to transfer the tote (or tote set) to the stage related to the sorting task or the stage related to the stage related to the packing task based on the attribute of the item included in the order. For example, the electronic apparatus 100 may determine whether each item corresponds to an item to be packaged in one plastic for delivery based on an attribute of the item (e.g., a size, a weight, and the like of the item). For example, the electronic apparatus 100 may classify items (orders) having attributes suitable for packaging individually in plastic for each of the items and allocate the items in a single batch.

In the sixth zone 213, a packed item 220 transferred from the fifth zone 211 may be temporarily stored. The packed item stored in the sixth zone 213 may be transferred to the seventh zone 215 based on an address. In the seventh zone 215, couriers 224A and 224B may deliver the packed item 220 to a destination of the address using various types of transportations 222 and 226.

Figure 3:
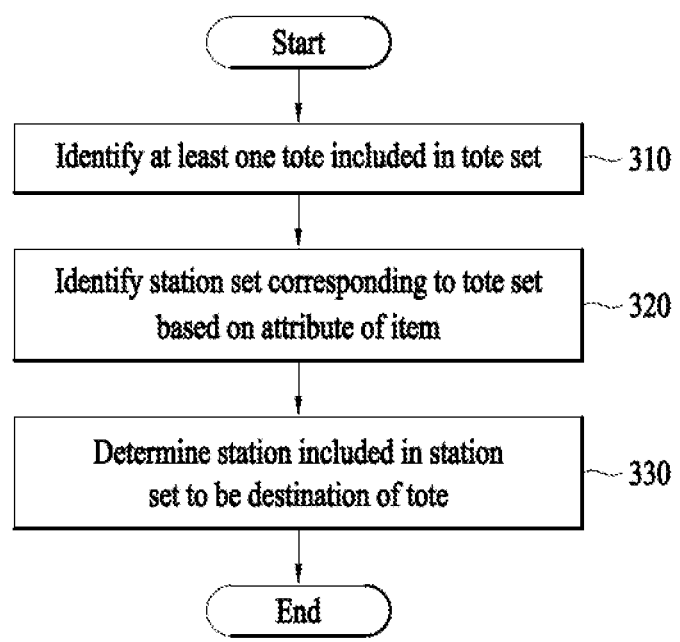
FIG. 3 is a flowchart illustrating a logistics managing method according to an example embodiment of the present disclosure.

FIG. 3 is a flowchart illustrating a logistics managing method according to an example embodiment of the present disclosure.

Referring to FIG. 3, in operation 310, the electronic apparatus 100 according to example embodiments may identify at least one tote included in a tote set.

The electronic apparatus 100 may manage at least one order received from a purchaser by allocating the at least one order to one batch. For example, one batch may include an order of at least one customer. For example, the electronic apparatus 100 may collect the at least one order based on a designated condition and determine the collected order as one batch. For example, the electronic apparatus 100 may determine at least one order included in a specific batch based on information associated with a time when the order is received, or determine at least one order included in a specific batch based on an attribute of an order (or ordered item).

A tote set may correspond to a set of totes including items corresponding to the at least one order managed by the one batch. In the example embodiment, the batch may be a value set by a user or a system and may include a tote including items corresponding to orders of a predetermined range. In an example, items of which an outbound time is earlier than a specific time may be picked through totes included the same batch. One tote may include an item that minimizes a movement for item pickup among items included in the corresponding batch. Furthermore, all items included in a batch may be picked through corresponding totes in an item picking process, whereby an item picking efficiency may be improved. Also, picking and packing statuses of orders managed for timely delivery may be checked based on a state of a tote included in a batch.

For example, the tote set may include a single tote or a plurality of totes based on an attribute of an order (or item) included in a corresponding batch. Each tote may correspond to, for example, a tote box in which items picked up by an operator in the fourth zone 209 of FIG. 2 are stored. Each tote may include one or more items. In operation 320, the electronic apparatus 100 according to example embodiments may identify a station set corresponding to the tote set based on an attribute of an item (or items) stored in the at least one tote identified in operation 310. Also, in an example embodiment, based on batch information corresponding to one tote, a corresponding station set may be identified.

The station set may correspond to a branch point that a picked item stored in a tote passes while moving to a station in which a subsequent task is to be performed. Specifically, when totes are allocated to a station set, stations included in the station set may process items included in the allocated totes. A scheme of allocating a tote to a station included in a station set will be described later.

For example, based on an attribute of an item included in the tote, the electronic apparatus 100 may identify a station set corresponding to the tote set according to whether the item is an item set to be packed immediately after a picking task is performed or is an item set to be classified after the picking task and then packed such that items included in other totes are packed along with the item.

For example, the FC 200 may include at least one station set located between the fourth zone 209 and the fifth zone 211. The item picked in the fourth zone 209 may be moved to a specific station area of the fifth zone 211 through the at least one station set so that a subsequent task is performed.

In one example embodiment, when an item included in the tote is an item set to be packed immediately after the picking task is performed, the electronic apparatus 100 may determine that a tote set including the item corresponds to a first station set including a station associated with an item packing task.

For example, the item set to be packed immediately after the picking task is performed may be selected based on at least one of user's order information, product information of a fulfillment center, and/or item information. In this example, even when one customer orders a plurality of items of different types, each of the items may be packed separately so that a courier delivers the separately packed items to the customer. For example, in such cases in which the items are packed separately, one item may be packed in one packaging material.

In another example embodiment, when the item included in the tote is an item set to be classified after the picking task and packed together with items included in other totes, the electronic apparatus 100 may determine that a tote set including the item corresponds to a second station set including a station associated with an item sorting task.

Meanwhile, when a station set including a station associated with the item sorting task is provided for each of a plurality of floors in the fourth zone 209, the electronic apparatus 100 may determine a station set corresponding to a floor in which a picking task of the corresponding tote is performed, to be the station set corresponding to the tote set.

In operation 330, the electronic apparatus 100 may determine one of at least one station included in the identified station set to be a destination of the at least one tote included in the tote set.

The at least one tote included in the tote set may be moved to the destination determined in operation 330, so that the item packing task or the item sorting task is performed in a corresponding station area.

When the identified station set includes a plurality of stations, in operation 330, the electronic apparatus 100 may determine one of the plurality of stations to be a destination of the at least one tote included in the tote set using a predetermined scheduling scheme.

For example, in operation 330, when it is identified that a specific tote set corresponds to a station set including a plurality of stations, the electronic apparatus 100 may use the Round-Robin scheme to determine one of the plurality of stations to be a destination of each of the at least one tote included in the tote set. Although the example embodiment employs the Round-Robin scheme to allocate the tote to the station, embodiments are not limited thereto. As would be apparent to those skilled in the art, other scheduling schemes may also be applied to allocate a tote to a station. For example, embodiments of the present disclosure may be implemented by adaptively allocating a tote reaching a station set to a station with a low workload in consideration of workloads of stations included in the station set.

For example, when a predetermined tote set includes a first tote, a second tote, a third tote, and a fourth tote, and when it is determined that the tote set corresponds to the first station set associated with the item packing task based on an attribute of an item included in the tote set, the electronic apparatus 100 may determine a station included in the first station set to be a destination of the first tote through the fourth tote.

For example, when the first station set includes a plurality of stations (e.g., a first station, a second station, and a third station), the electronic apparatus 100 may determine destinations of the first tote through the fourth tote using the Round-Robin scheme. For example, the destination of the first tote may be determined to be the first station, the destination of the second tote may be determined to be the second station, the destination of the third tote may be determined to be the third station, and the destination of the fourth tote may be determined to be the first station. The first station through the third station may correspond to station areas in which the packing task is to be performed. The electronic apparatus 100 may prevent an excessive increase in workload in a specific station by substantially equally distributing totes included in a tote set to a plurality of stations.

Although not shown in FIG. 3, the electronic apparatus 100 according to example embodiments may display, through a display (or a display of the user terminal 200), information on or regarding the tote set and information on the station set identified as corresponding to the tote set.

For example, the electronic apparatus 100 may provide at least a portion of information associated with a transfer location of at least one tote included in the tote set, information on a task status of the tote set, and shipping request time information of the tote set.

For example, the electronic apparatus 100 may display information regarding whether the at least one tote is moved to a destination or a station set, as the information associated with the transfer location of the at least one tote included in the tote set. For example, in the displaying operation, the electronic apparatus 100 may display a tote that is being moved to a tote destination or station set and a tote that has been moved in different ways so as to be distinguished from each other. Through this, the electronic apparatus 100 may provide information on a moving situation of the at least one tote included in the tote set.

For example, the electronic apparatus 100 may display information regarding whether the pickup is completed for each tote included in the tote set, as the task status information of the tote set. For example, the electronic apparatus 100 may display information regarding whether a tote included in the tote set is currently being picked or has been picked up.

The operator (task manager) may identify the displayed information, thereby intuitively identifying a movement status and a task status of each tote included in a tote set and more effectively managing the tote set.

FIG. 4 is a diagram illustrating display screen information of an electronic apparatus according to an example embodiment of the present disclosure.

Referring to FIG. 4, the electronic apparatus 100 according to example embodiments may output information 401, 402, 403, and 405 on a tote set and information 404 on a station set corresponding to the tote set through a display screen.

According to an example embodiment, the electronic apparatus 100 may output, on the display screen, information on or regarding a tote set including one or more pickup-completed totes among a plurality of tote sets managed in the FC 200.

For example, the electronic apparatus 100 may retrieve a tote set including at least one pickup-completed tote from tote sets newly generated within a predetermined period of time (e.g., last two days) based on a user's information inquiry time, and display the corresponding information. For example, when a plurality of tote sets is retrieved, the electronic apparatus 100 may list and display the tote sets in an order of an earlier shipping request time based on shipping request time information of each tote set.

Meanwhile, when an outbound task for each tote included in the displayed tote set is completed, the electronic apparatus 100 may exclude information on a corresponding tote set from the display screen.

That is, in response to item pickup of a tote among totes included in a tote set being completed, the electronic apparatus 100 according to an example embodiment may output information on the tote set on the display screen. Also, in response to packing and shipping for all totes included in the tote set being completed, the electronic apparatus 100 may exclude the information on the tote set from the display field. Through this, the electronic apparatus 100 may efficiently provide information on a task progress of a tote set that has been picked up and not been shipped yet.

Meanwhile, only for a tote set determined to be packed immediately after the picking task without performing a separate sorting task, the electronic apparatus 100 according to example embodiments may output information on the tote set on the display screen. Through the display screen, the electronic apparatus 100 may provide information on a task progress of tote sets set to be packed immediately after the picking task is performed.

According to example embodiments, when inquiring information on the tote set, the electronic apparatus 100 may display the tote set identification information 401 indicating each tote set satisfying a designated condition and the tote identification information 405 indicating each tote included in the tote set. Also, the electronic apparatus 100 may display the task status information 402 of each tote set, the shipping request time information 403, and the information 405 on the transfer location of each tote included in the tote set.

As an example, the task status information 402 of each tote set may be information regarding whether the picking task of each tote set is completed and may be displayed as one of "currently being picked" or "pickup completed." As another example, the task status information 402 of the tote set may include at least a portion of information regarding whether the picking task of each tote set is completed, information regarding whether the sorting task is completed, or information regarding whether the packing task is completed. For example, a tote set viewed on the display screen may correspond to those set to be packed after the picking task without performing a separate sorting task. In this case, when a specific tote set has been picked up and moved to a station for the packing task and is currently being packed, a task status of the tote set may be displayed as "sorting completed" or "currently being packed."

The shipping request time information 403 of the tote set may correspond to information for managing a work deadline determined based on an expected shipping date of an order corresponding to the tote set. In an example embodiment, the electronic apparatus 100 may list and display tote sets in an order in which the shipping request time is imminent based on the shipping request time information 403.

The information 404 on the station set corresponding to the tote set may correspond to identification information of a branch point that at least one tote included in the tote set passes while moving to a station in which a subsequent task is to be performed. For example, the station set corresponding to the tote set may be determined based on a picking task place in which the picking task of the tote set is performed. The station set corresponding to the tote set may correspond to, for example, a station set located on the same floor as the picking task place.

Meanwhile, in terms of the information 205 on a tote included in the tote set, the electronic apparatus 100 according to example embodiments may display the information 205 to contain tote identification information corresponding to each tote and information on a transfer location of the tote.

For example, the tote information 405 may be displayed differently based on whether totes included in each tote set have been moved to destinations (or station sets). For example, the electronic apparatus 100 may display a tote that is moving and a tote that has been moved to a destination in different ways so as to be distinguished from each other. For example, the electronic apparatus may provide information on a moving state of each tote by displaying a background color, a background pattern, a highlight, a font, an underline, and the like of tote identification information corresponding to each tote in different ways. In another example embodiment, the electronic apparatus 100 may also provide task progress information of an individual tote by differently displaying tote identification information corresponding to a tote on which the packing task is completed from that of the tote that is moving and the tote that has been moved in a field of the tote information 405.

For example, as shown in the display screen of FIG. 4, in terms of a first tote set having a tote set ID number "453", a user (task manager) may identify that the first tote set includes a first tote having a tote ID number "453213", an item pickup of the first tote is completed, a transfer to a station set (Y Line) corresponding to the first tote set is completed, and a shipping request time of the first tote set is 19:30 on Mar. 24, 2020.

Also, a third tote set having a tote set ID number "452" may include at least six totes (tote ID number "452101", tote ID number "452614", tote ID number "452903", tote ID number "452245", tote ID number "452288", tote ID number "452662"). In terms of the six totes, it can be known that the item pickup is completed, four (tote ID number "452614", tote ID number "452903", tote ID number "452245", tote ID number "452662") of the six totes have been moved to a station set (X Line) corresponding to the third tote set, two (tote ID number "452101", tote ID number "452288") of the six totes are moving now, and a shipping request time of the third tote set corresponds to 19:30 on Mar. 24, 2020.

Meanwhile, the electronic apparatus 100 according to an example embodiment may include an interface 406 for selectively retrieving a tote set corresponding to a specific station set in the display screen. For example, a user may retrieve only a tote set (e.g., tote set ID number "453") corresponding to a station set (e.g., Y Line) through the interface 406 such that the retrieved tote set is selectively displayed.

FIG. 5 is a diagram illustrating a display information screen of an electronic apparatus according to an example embodiment of the present disclosure.

According to example embodiments, a predetermined FC, for example, the FC 200 managed by the electronic apparatus 100 may include at least one station set (e.g., X Line, Y Line, Z Line) and at least one station (e.g., X1 through X7, Y1, Z1) included in the at least one station set.

The electronic apparatus 100 may use a field "station set setting change" 503 to receive an input for setting information on or regarding a station and a station set included in the FC 200 from a user. Each station displayed on a display screen shown in FIG. 5 may correspond to a station associated with an item packing task. For example, the second station set (e.g., Y Line) may include a station (e.g., Y1) associated with an item packing task and a station (e.g., Y2, not shown) associated with an item sorting task. The user may include, in a station field of FIG. 5, only the station (e.g., Y1) associated with the item packing task among a plurality of stations included in the second station set.

For example, like a first station set (e.g., X Line), when it is set to include a plurality of stations (e.g., X1 through X7) associated with the item packing task, the electronic apparatus 100 may allocate each tote of a tote set identified as corresponding to the first station set (X Line), to the plurality of stations (X1 through X7) associated with the item packing task using a predetermined scheduling scheme. For example, the electronic apparatus 100 may determine one of the stations (X1 through X7) included in the first station set (X Line) to be a destination of each tote included in a tote set using a Round-Robin scheme.

FIG. 6 is a diagram illustrating a display information screen of an electronic apparatus according to an example embodiment of the present disclosure. For example, FIG. 6 illustrates a screen displaying detailed information on a tote set in response to reception of a user input selecting identification information corresponding to the tote set in the display information screen of FIG. 5.

Referring to FIG. 6, the electronic apparatus 100 according to example embodiments may display detailed information on a tote set based on a user input.

For example, the detailed information on the tote set may include at least one of identification information 601 (e.g., tote set ID "453") corresponding to the tote set, task status information 602 and 608 (e.g., "being picked", "pickup completed") of the tote set, information 603 and 609 (e.g., manager ID "John") on a task operator of the tote set, manager access time information "2020-07-31 14:36:15", manager access information (e.g., "log-in", "log-out"), shipping request time information 604 (e.g., "2020-07-31 17:45:00") of the tote set, pickup completion time information 605 (e.g., "2020-07-31 14:39:39") of a tote included in the tote set, information 606 (e.g., "packing Z Line-Z1") on a destination of a tote and a station set corresponding to the tote set, and/or identification information 607 and 612 (e.g., cart (tote) "453213") corresponding to a tote included in the tote set.

In addition, the detailed information on the tote set may further include information 610 and 611 (e.g., shipping number information, order number information) on one or more orders included in the tote set. For example, in response to reception of a user input for one of information on the one or more orders included in the tote set, the electronic apparatus 100 may provide a user interface that additionally displays detailed information of the corresponding order information.

FIG. 7 is a diagram illustrating a display information screen of an electronic apparatus according to an example embodiment of the present disclosure. For example, FIG. 7 illustrates a screen displaying detailed information on a tote in response to reception of a user input selecting identification information corresponding to the tote in the display information screen of FIG. 5.

Referring to FIG. 7, the electronic apparatus 100 according to example embodiments may display detailed information on a specific tote based on a user input.

For example, the detailed information on the tote may include at least a portion of identification information 701 and 716 (e.g., tote ID information "456861") corresponding to the tote, next task information 702 (e.g., tote use "pack-ing") of the tote, tote destination information 703 (e.g., station "Z1"), tote task status information 704 and 705 (e.g., whether to move tote to destination "tote movement completed", movement completion time "2020-07-31 14:25:19", task request time "2020-07-31 14:20:25"), tote set information 707 (e.g., tote set ID information "456") corresponding to the tote, task information 708 (e.g., Batch Job ID "127767049", "picking completed") of a tote set corresponding to the tote, shipping request time information 709 (e.g., 2020-07-31 17:45:00) of the tote set corresponding to the tote, task location information 710, 711, and 712 (e.g., re-batch location, re-bin location, packing location "Z Line-Z1") of the tote, and detailed information for each order included in the tote (e.g., information 713 regarding whether picking of each order is completed, information 714 on an item included in each order, shipping number information 715 corresponding to each order, pickup completion time information 717 for each order). For example, a display screen that displays the detailed information on the tote may further include an interface 706 for changing a task status of the tote.

Figure 8:
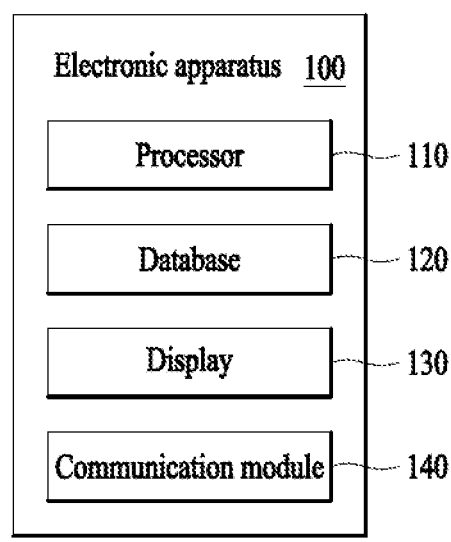
FIG. 8 is a block diagram illustrating an electronic apparatus according to example embodiments of the present disclosure.

FIG. 8 is a block diagram illustrating an electronic apparatus according to example embodiments of the present disclosure.

Referring to FIG. 8, according to example embodiments, the electronic apparatus 100 (e.g., server) may include at least one of a processor 110, a database 120, a display 130, and/or a communication module 140.

The processor 110 may process a series of operations for performing a logistics managing method according to example embodiments of the present disclosure. The processor 110 may overall control other components of the electronic apparatus 100.

For example, the processor 110 may identify at least one tote included in a predetermined tote set satisfying a designated condition and identify a station set corresponding to a tote set based on an attribute of an item included in the at least one tote.

The processor 110 may determine one of at least one station included in the station set corresponding to the tote set to be a destination of the at least one tote. For example, the processor 110 may determine one of a plurality of stations included in a station set to be a destination of a tote using a predetermined scheduling scheme (e.g., Round-Robin scheme).

In addition, the processor 110 may execute various functions related to logistics management according to example embodiments of the present disclosure as described with reference to FIG. 3.

The database 120 may be a data structure implemented in a predetermined storage space of the electronic apparatus 100, where functions such as storing, searching, deleting, editing, or adding data are freely performed. For example, the database 120 may have fields or components for processing functions such as storing, searching, deleting, editing, or adding data.

The database 120 may store data related to various functions of the electronic apparatus 100. For example, the database 120 may store various information associated with a fulfillment center, and in addition, may store instructions or data for an execution operation of the processor 120.

The display 130 may display various information associated with an operation of the electronic apparatus 100. For example, the display 130 may display information on or regarding a tote set, information on a station set corresponding to the tote set, and information on a tote included in the tote set. According to an example embodiment, the electronic apparatus 100 may not include the display 130. In this case, the electronic apparatus 100 may provide display information by transmitting the information to be displayed to another device (e.g., the user terminal 200) through the communication module 140, so that the information is displayed on a display included in the other device.

The communication module 140 may perform a function of transmitting information stored in the database 120 of the electronic apparatus 100 or predetermined information processed by the processor 110 to another device, or receiving predetermined information from another device into the electronic apparatus 100. For example, the communication module 140 may receive predetermined user input information from the user terminal 200. In the example embodiment, the communication module 140 may include a transceiver for transmitting and receiving information.

The present specification and drawings have been described with respect to the example embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present disclosure may be implemented in addition to the embodiments disclosed herein.

What is claimed is:

1. A method operable by an electronic apparatus for managing logistics, the electronic apparatus configured to communicate with a user terminal via a network, the method comprising:
   receiving, via a transceiver of the electronic apparatus from the user terminal, an indication that an item has been picked;
   determining task instruction information, wherein the task instruction information identifies a next task associated with the item, wherein the next task comprises one or more of a sorting task or a packing task, wherein the sorting task comprises a task to sort the item based on order information and the packing task comprises a task to pack the item for delivery, wherein performance of the sorting task causes the item to be sorted and performance of the packing task causes an unsorted item or a sorted item to be packed for delivery, wherein:
      based on a determination that the item should be packaged individually, determining that the next task is the packing task; or
      based on a determination that the item should not be packaged individually, determining that the next task is the sorting task;
   identifying, by a processor of the electronic apparatus, at least one tote of a tote set, wherein the at least one tote comprises the item;
   identifying, by the processor, a station set from a first station set and a second station set, wherein the packing task is performed at the first station set and the sorting task is performed at the second station set, the station set corresponding to the at least one tote based on determining that the next task corresponds to an attribute of the station set, the station set comprising one or more stations, wherein the attribute of the station set identifies a task that is performed at the station set;
   determining, by the processor, a station of the one or more stations to be a destination of the at least one tote, wherein the next task is performed at least at the station of the one or more stations of the station set based on the attribute of the station set;
   controlling a conveyor to cause the conveyor to transport the at least one tote to the station; and
   transmitting to the user terminal, via the transceiver, first information identifying the station to which the conveyor transported the at least one tote and second information identifying the at least one tote, wherein the transmitting the first information and the second information causes display, via a display unit of the user terminal, of the first information and the second information.

2. The method of claim 1, wherein determining the station to be the destination of the at least one tote comprises:
   determining the station to be the destination of the at least one tote using a predetermined scheduling scheme.

3. The method of claim 1, further comprising:
   displaying information associated with the tote set and information associated with the station set.

4. The method of claim 3, wherein the information associated with the tote set comprises information associated with a transfer location of the at least one tote of the tote set, task status information of the at least one tote of the tote set, or shipping request time information of the tote set.

5. The method of claim 4, wherein the task status information comprises identification information of at least one pickup-completed tote, and a first tote of the at least one pickup-completed tote on which packing is completed is displayed differently compared to a second tote of the at least one pickup-completed tote on which packing is not completed.

6. The method of claim 1, further comprising:
   displaying task information associated with the tote set, wherein the task information comprises the task instruction information.

7. The method of claim 6, wherein displaying the task information comprises:
   excluding at least a portion of information associated with the tote set from displayed task information in response to one or more tasks associated with one or more totes of the tote set being completed.

8. The method of claim 6, wherein the task information associated with the tote set comprises tote set identification information corresponding to the tote set and tote identification information corresponding to the at least one tote of the tote set, the method further comprising, based on a user input of selecting the tote set identification information or the tote identification information, displaying detailed information associated with the user input.

9. The method of claim 8, wherein the detailed information comprises information associated with an order of the item of the at least one tote.

10. An electronic apparatus comprising:
    a communication module;
    a display; and
    a processor, wherein the processor is configured to:
       receive, via the communication module from a user terminal, an indication that an item has been picked,
       determine task instruction information, wherein the task instruction information identifies a next task associated with the item, wherein the next task comprises one or more of a sorting task or a packing task, wherein the sorting task comprises a procedure to sort the item based on order information and the packing task comprises a procedure to pack the item for delivery, wherein performance of the sorting task causes the item to be sorted and performance of the packing task causes an unsorted item or a sorted item to be packed for delivery, wherein:

based on a determination that the item should be packaged individually, determining that the next task is the packing task; or based on a determination that the item should not be packaged individually, determining that the next task is the sorting task;

identify, by the processor, at least one tote of a tote set, wherein the at least one tote comprises the item;

identify, by the processor, a station set from a first station set and a second station set, wherein the packing task is performed at the first station set and the sorting task is performed at the second station set, the station set corresponding to the at least one tote based on determining that the next task corresponds to an attribute of the station set, the station set comprising one or more stations, wherein the attribute of the station set identifies a task that is performed at the station set;

determine, by the processor, a station of the one or more stations to be a destination of the at least one tote, wherein the next task is performed at least at the station of the one or more stations of the station set based on the attribute of the station set;

control a conveyor to cause the conveyor to transport the at least one tote to the station; and transmit to the user terminal, via the communication module, first information identifying the station to which the conveyor transported the at least one tote and second information identifying the at least one tote, wherein transmitting the first information and the second information causes display, via a display unit of the user terminal, of the first information and the second information.

11. The electronic apparatus of claim 10, wherein the processor is further configured to determine the station to be the destination of the at least one tote using a predetermined scheduling scheme.

12. The electronic apparatus of claim 10, wherein the processor is further configured to display, via the display, information associated with the tote set and information associated with the station set.

13. The electronic apparatus of claim 12, wherein the information associated with the tote set comprises information regarding a location of the at least one tote of the tote set, task status information of the at least one tote of the tote set, or shipping request time information of the tote set.

14. The electronic apparatus of claim 13, wherein the task status information of the at least one tote comprises identification information of pickup-completed totes, wherein the processor is further configured to display, via the display, information associated with a first tote of the pickup-completed totes on which packing is completed differently compared to a second tote of the pickup-completed totes on which packing is not completed.

15. A method for managing logistics comprising:
receiving an indication that an item has been picked;
determining task instruction information, wherein the task instruction information identifies a task associated with the item, wherein the next task comprises one or more of a sorting task or a packing task, wherein the sorting task comprises a procedure to sort the item based on order information and the packing task comprises a procedure to pack the item for delivery, wherein performance of the sorting task causes the item to be sorted and performance of the packing task causes an unsorted item or a sorted item to be packed for delivery, wherein:

based on a determination that the item should be packaged individually, determining that the next task is the packing task; or based on a determination that the item should not be packaged individually, determining that the next task is the sorting task;

identifying at least one tote of a tote set, wherein the at least one tote comprises the item;

determining a destination of the at least one tote based at least in part on the task instruction information, wherein determining the destination of the at least one tote comprises:

identifying a station set from a first station set and a second station set, wherein the packing task is performed at the first station set and the sorting task is performed at the second station set, the station set corresponding to the at least one tote based on determining that the next task corresponds to an attribute of the station set, the station set comprising one or more stations, wherein the attribute of the station set identifies a task that is performed at the station set;

determining a station of the one or more stations to be the destination of the at least one tote using a Round-Robin scheme, wherein the next task is performed at least at the station of the one or more stations of the station set based on the attribute of the station set;

controlling a conveyor to cause the conveyor to transport the at least one tote to the station; and transmitting first information identifying the station to which the conveyor transported the at least one tote and second information identifying the at least one tote, wherein transmitting the first information and the second information causes display of the first information and the second information.

16. The method of claim 15, further comprising:
displaying information associated with the tote set and information associated with the at least one tote, wherein information associated with the at least one tote comprises information associated with whether the at least one tote as moved to the destination.

17. The method of claim 16, wherein the information associated with the at least one tote comprises information regarding whether a picking task of the at least one tote is completed or information regarding whether a packing task of the at least one tote is completed.

18. The method of claim 1, wherein the determination that the item should be packaged individually is based on at least one of order information, product information of a fulfillment center, or item information.

19. The method of claim 18, wherein the determination is based on the item information, the item information comprises an attribute of the item, and wherein the determination that the item should be packaged individually is based on a determination, based on the attribute of the item, that the item should be packaged using a single plastic for delivery.

20. The method of claim 19, wherein the attribute of the item comprises a size of the item or a weight of the item.

* * * * *